(12) United States Patent
Ruckle et al.

(10) Patent No.: US 7,513,316 B2
(45) Date of Patent: Apr. 7, 2009

(54) IMPLEMENT REAR HITCH HEIGHT AND ATTITUDE CONTROL

(75) Inventors: Jarrod Ray Ruckle, Bondurant, IA (US); David Lee Steinlage, Adel, IA (US)

(73) Assignee: Deere & Company, Moline, IL (US)

( * ) Notice: Subject to any disclaimer, the term of this patent is extended or adjusted under 35 U.S.C. 154(b) by 183 days.

(21) Appl. No.: 11/522,269

(22) Filed: Sep. 15, 2006

(65) Prior Publication Data

US 2008/0121402 A1    May 29, 2008

(51) Int. Cl.
*A01B 59/00* (2006.01)
*A01B 63/00* (2006.01)

(52) U.S. Cl. ........................... 172/677; 172/482

(58) Field of Classification Search ............... 172/439, 172/445, 444, 482, 677, 396, 452, 460, 474, 172/487, 459, 255
See application file for complete search history.

(56) References Cited

U.S. PATENT DOCUMENTS

| | | | |
|---|---|---|---|
| 2,328,343 A | | 8/1943 | Jacob |
| 3,658,362 A | | 4/1972 | Fackler et al. |
| 3,912,017 A | | 10/1975 | Rehn |
| 4,048,929 A | * | 9/1977 | Zumbahlen ............ 111/146 |
| 4,371,039 A | * | 2/1983 | Schaaf et al. ............ 172/244 |
| 4,373,591 A | * | 2/1983 | Schaaf et al. ............ 172/328 |
| 4,428,435 A | | 1/1984 | Hubbard et al. |
| 4,450,917 A | | 5/1984 | Hake |
| 4,572,087 A | * | 2/1986 | Brannan ............ 111/56 |
| 4,677,922 A | * | 7/1987 | Shrull et al. ............ 111/52 |
| 5,343,958 A | * | 9/1994 | Kromminga et al. ............ 172/680 |
| 5,386,680 A | * | 2/1995 | Friesen ............ 56/14.9 |
| 5,413,182 A | * | 5/1995 | Kromminga et al. ............ 172/776 |
| 5,590,721 A | * | 1/1997 | Van Mill ............ 172/138 |
| 5,809,914 A | * | 9/1998 | Follmer ............ 111/56 |
| 5,992,535 A | | 11/1999 | Bierl et al. |
| 6,269,887 B1 | | 8/2001 | Friggstad |
| 6,397,953 B1 | * | 6/2002 | Ankenman ............ 172/445.1 |
| 6,679,339 B1 | * | 1/2004 | Steinlage et al. ............ 172/395 |
| 6,810,968 B2 | | 11/2004 | Myers |
| 7,017,675 B2 | * | 3/2006 | Ankenman et al. ............ 172/146 |

\* cited by examiner

*Primary Examiner*—Thomas B Will
*Assistant Examiner*—Matthew D Troutman (57) ABSTRACT

Implement hitch height control structure to maintain a rear hitch point at a generally constant height as the implement is raised and lowered. In one embodiment, a rectangular hitch frame is pivotally connected at a forwardmost end to lever arms on the implement lift rockshaft. Linkage structure connected between the hitch frame and the implement frame help control hitch frame attitude, rear hitch point height and force transfer to the implement frame. The hitch frame is located substantially behind the implement rockshaft for minimal interference with tool placement on the frame and limited interference with trash and soil flow under the main frame. In another embodiment, linkage structure includes a second rockshaft connected generally above the aft end of the main frame.

20 Claims, 6 Drawing Sheets

IMPLEMENT REAR HITCH HEIGHT AND ATTITUDE CONTROL

FIELD OF THE INVENTION

The present invention relates generally to agricultural implements and, more specifically, to self-leveling rear towing hitches for such implements.

BACKGROUND OF THE INVENTION

Agricultural tillage and seeding implements sometimes include a rear hitch for towing a trailing supply device such as a fertilizer or seed tank. Normally the implement frames raise and lower to engage and disengage the ground engaging components, and therefore the height of most conventional rigid mounted rear hitches changes with such vertical movement. When the machine is fully raised for transport, the hitch tends to be substantially higher than when lowered to the field operating position. The hitch for the trailing device therefore is at a non-optimal angle during transport, and forces on the hitch and implement can be increased as a result. Although structures such as shown in U.S. Pat. No. 5,343,958 are available to maintain trailing hitch height with implement raising and lowering, such devices can interfere with soil and trash flow and limit the placement of tillage or seeding tools on the implement frame and with trailing tools mounted behind the main frame. Many of the previously available hitch structures require hitch beams that extend to the forward extremity of the main frame.

SUMMARY OF THE INVENTION

Rear hitch structure to keep the trailing hitch point at a generally constant ideal height with raising and lowering of the implement utilizes a simple pivotal link structure connected to the main depth control rockshaft. In one embodiment of the invention, a hitch frame is pivotally connected at a forward end to lever arm structure on the rockshaft. Link structure having a forward end pivotally connected to the implement frame extends rearwardly to a connection with central portion of the hitch frame so that the height above ground of the aft end of the hitch frame remains generally constant as the implement is moved between a raised transport position and lowered field-working positions. The box frame is accommodated substantially behind the implement rockshaft or pivotal connection of the wheel lift arms to the main frame for minimal interference with tool placement on the frame and limited interference with trash and soil flow under the main frame. The lever arm and link structures also provide some hitch frame leveling over the lift range of the implement and help distribute towing forces to the frame.

In another embodiment, the rear hitch is connected to a hitch rockshaft supported above the frame and connected to a single fore-and-aft extending hitch beam which extends over rear-mounted tools. By connecting the forward end of the rear hitch near the lift rockshaft rather than farther forward on the main frame, reductions in cost, complexity, weight and material flow interference are achieved.

These and other objects, features and advantages of the present invention will become apparent from the detailed description below and from the drawings.

DESCRIPTION OF THE PREFERRED EMBODIMENT

Figure 1:
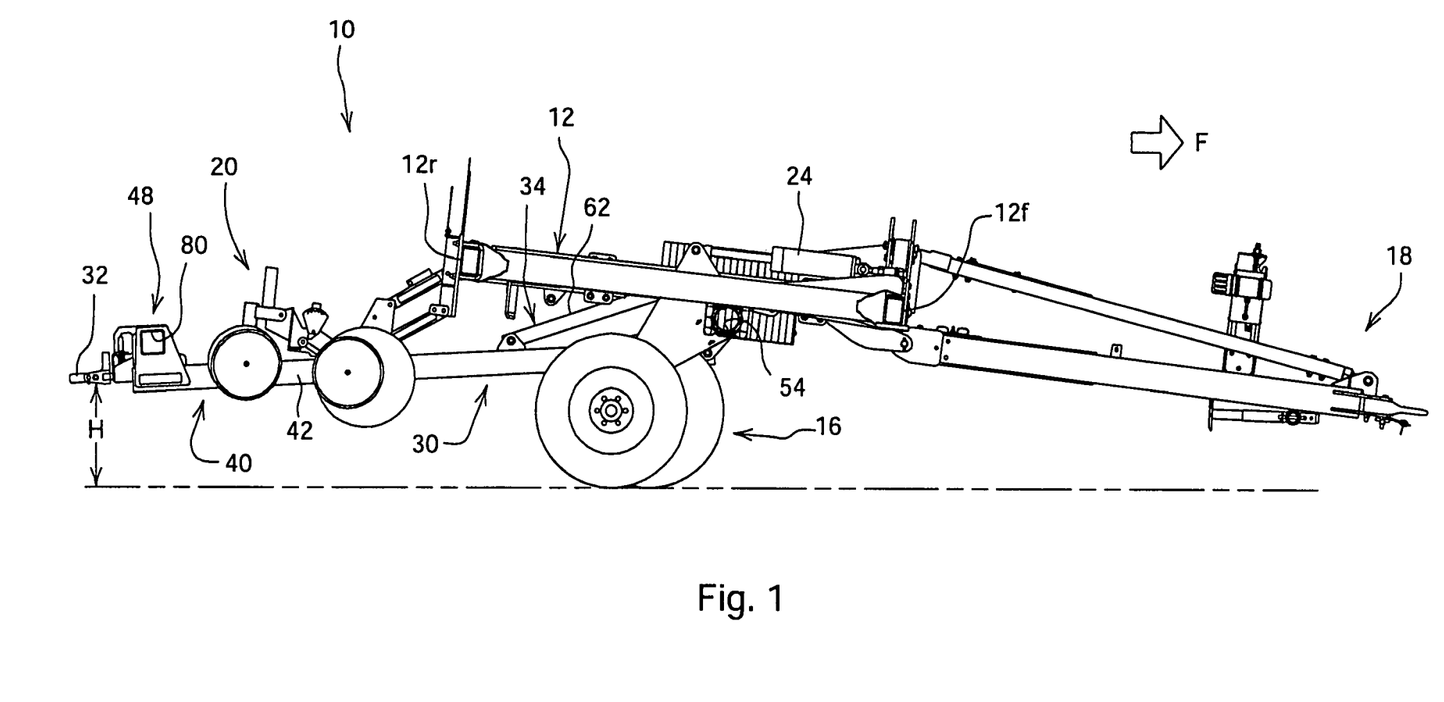
FIG. 1 is a side view of portion of an implement with rear tools and a rear leveling hitch attached with the implement in a raised transport position.

Referring to FIG. 1, therein is shown a tillage implement 10 including a main frame 12 supported by lift wheel assemblies 16 for forward movement (F) over the ground. A forward hitch assembly 18 adapted for connection to a towing vehicle (not shown) is attached to the frame 12. The frame 12 supports conventional earth engaging tools such as shovels, sweeps or furrow openers, as well as trailing tools indicated generally at 20. The trailing tools 20, which are shown by way of example only as seeding or fertilizing tools, are located substantially behind a rearmost portion 12r of the main frame 12.

Figure 3:
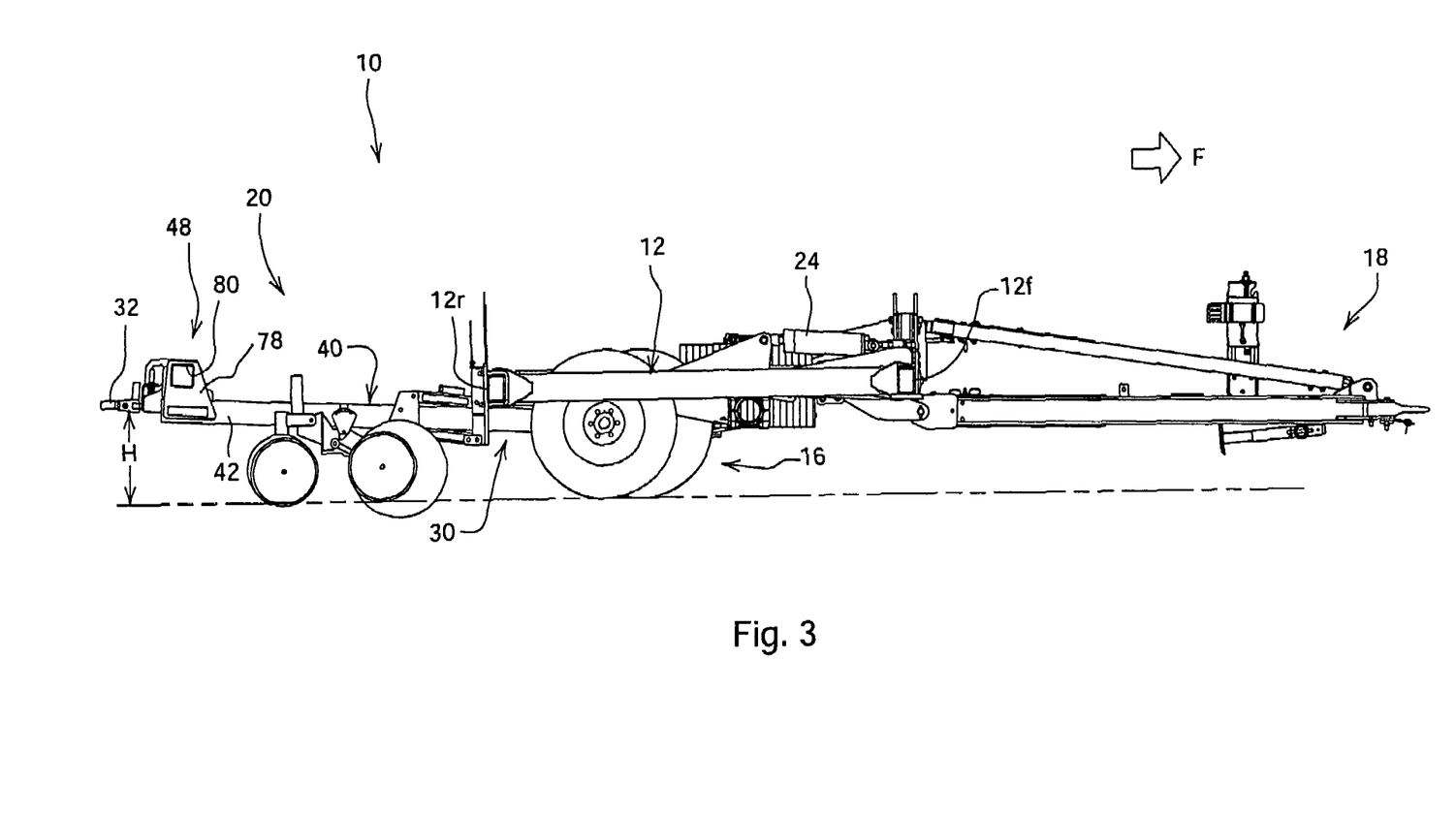
FIG. 3 is a view similar to FIG. 1 but showing the implement in the lowered field-working position.

Hydraulic cylinders 24 operably connected to the lift wheel assemblies 16 raise and lower the frame 12 for moving the implement 10 between a raised transport position (FIG. 1) and lowered field-working positions (FIG. 3). A rear hitch assembly 30 is movably mounted on the main frame 12 and includes a rear connector 32 for towing a trailing implement (not shown) behind the trailing tools 20. The hitch assembly 30 includes a hitch attitude control structure 34 for reducing hitch assembly attitude changes and maintaining a generally constant height (H) of the connector 32 above the surface of the ground as the implement 10 is moved between the transport and field-working positions. The control structure 34 also transfers a substantial portion of the towing and attitude control forces directly to the main frame 12. As shown in the embodiment of FIGS. 1 and 3, the hitch assembly 30 is maintained substantially under the frame 12 and aft of a forwardmost portion of the frame.

The hitch assembly 30 includes a generally rectangular box-shaped frame 40 (FIG. 2) forming a hitch frame or beam having side members 42 connected by a forward transverse member 44, a central transverse member 46 and a rear hitch connector assembly 48 that supports the connector 32. The forward ends of the side members 42 are pivotally connected by pivot pins 51 to hitch support lever arms 52 radially extending in rearward and downward directions (FIG. 2) from a main lift rockshaft 54. The lever arms 52 rotate with the rockshaft 54 causing the forward end of the frame 40 to move. The rockshaft 54 is rotatably mounted on the main frame 12 for rotation about an axis 54a transverse to the forward direction F. Hitch attitude control link structure 62 is connected at an upper forward end to pivot structure 64 fixed to the frame 12 above the axis 54a and at a lower rearward end to pivots 66 connected to the central transverse member 46.

Figure 2:
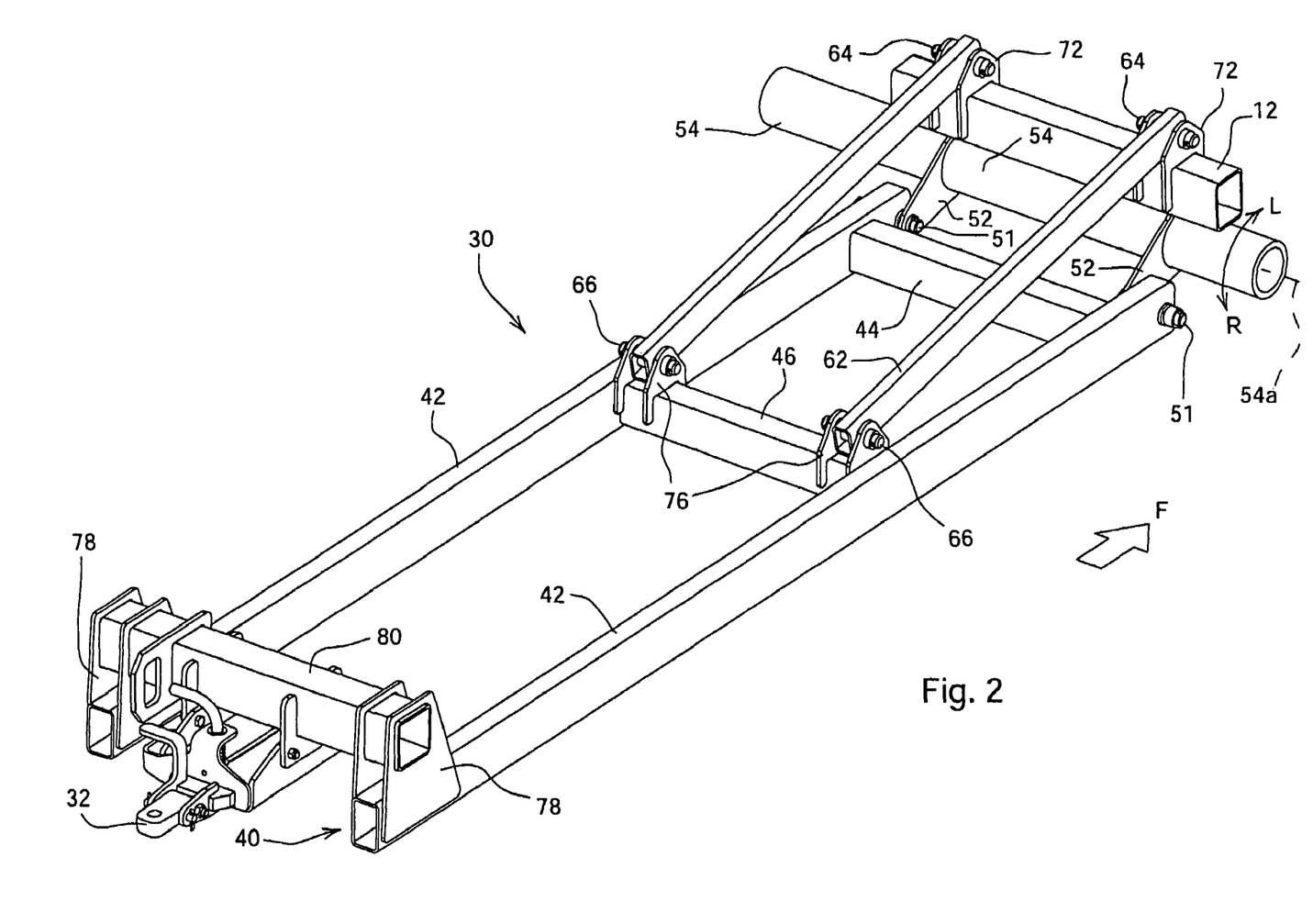
FIG. 2 is an enlarged perspective view of the leveling hitch shown in FIG. 1.

As the hydraulic cylinders 24 are retracted to rotate the rockshaft 54 in the clockwise direction (L) as seen in FIG. 2 to lower the implement 10, the arms 52 move the pivot pins 51 and the forward ends of the side members 42 rearwardly causing the aft ends of the members 42 to rotate upwardly about the pivotal connections at 66. The upward rotation of the aft ends with the connector 32 is generally equal to the downward movement of the implement so that the height H of the connector 32 above the ground remains approximately constant. Rotation of the rockshaft 54 in the opposite direction (R) to raise the implement 10 causes the aft ends of the members 42 to move in the opposite direction to generally maintain a constant height H (FIGS. 1 and 3). The link and arm structure described above also provides a leveling effect on the beams 42 to minimize the change in angle of the frame 40 as the implement moves between raised transport and lowered field-working positions. With lowering of the implement 10, the lever arms 52 move upwardly and rearwardly as the control link structure 62 moves the aft end of the hitch upwardly. The action not only provides a leveling effect on the hitch frame but also improves hitch load transfer characteristics and trash and soil flow clearance under the hitch frame. Substantial hitch towing forces and hitch attitude control forces are transferred through the control link structure 62 to the frame 12 to avoid excess forces on the lift rockshaft 54.

As shown in FIG. 2, the link structure 62 includes a pair of transversely spaced links pivotally connected at upper forward ends to the main frame 12 by brackets 72 which receive the pivots 64. The pivots 64 are located above the frame 12 and the axis 54a. The structure 62 is connected at lower aft ends by the pivots 66 which extend through brackets 76 mounted on the central transverse member 46 adjacent the members 42.

The rear hitch connector assembly 48 includes brackets 78 fixed to the aft ends of the members 42 and extending upwardly to connections with a transversely extending hitch beam 80. The connector 32 is connected to and depends from the beam 80. The connector 32 is aligned vertically with the members 42 for good hitch frame force transfer characteristics, and the construction provides added clearance under the beam 80 between the connector 32 and the insides of the members 42.

Figure 4:
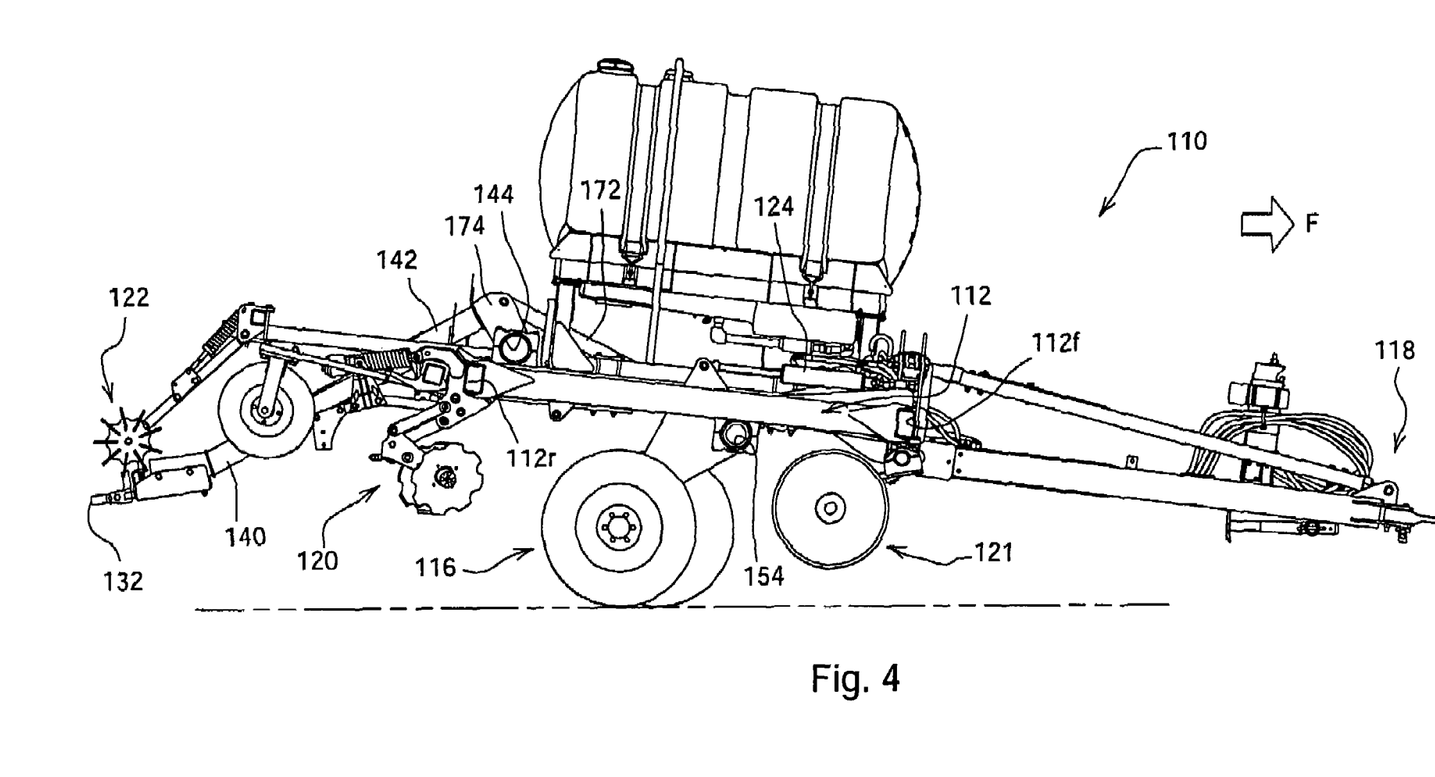
FIG. 4 is a side view of an implement with additional rear tools and with an alternate embodiment of a leveling hitch including a hitch rockshaft.
Figure 5:
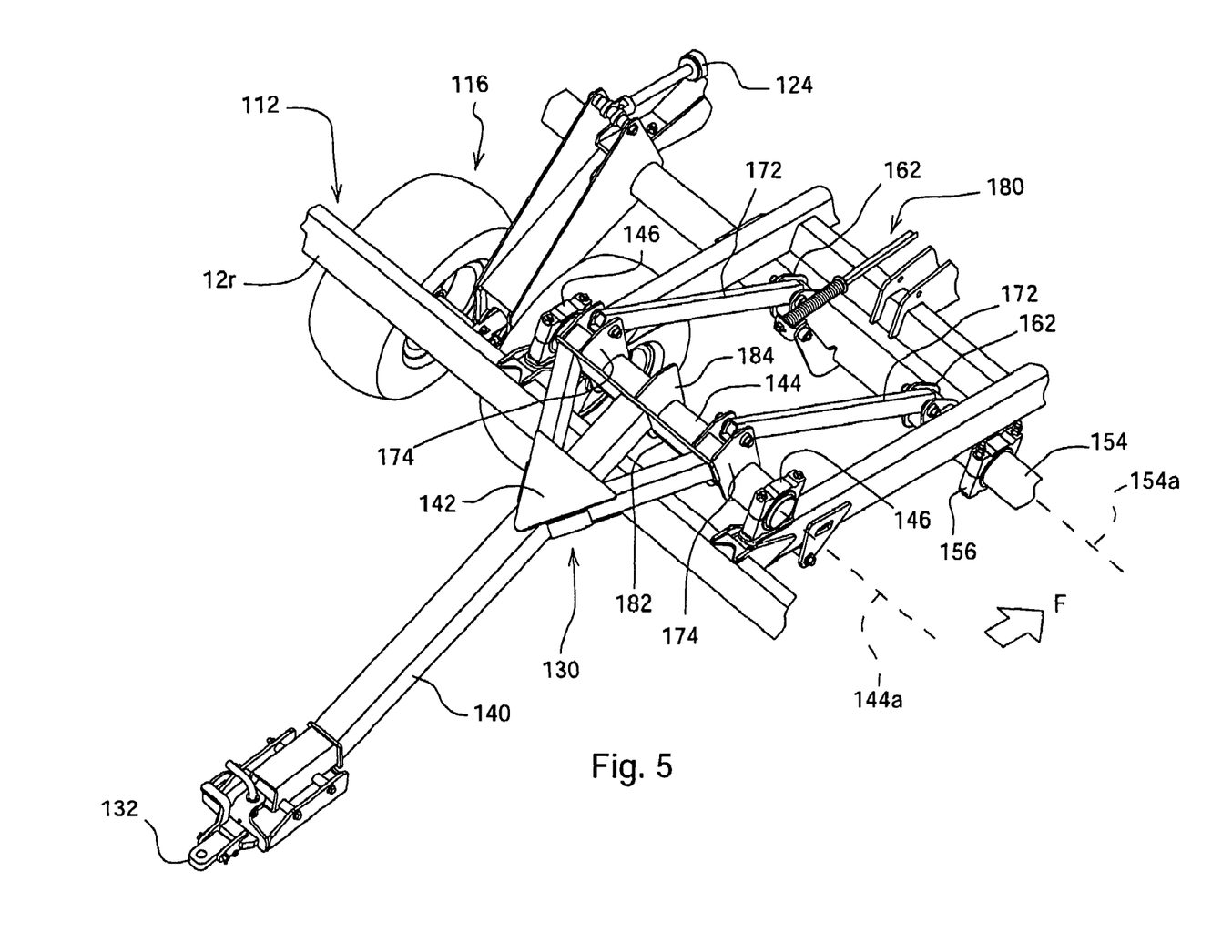
FIG. 5 is an enlarged perspective view of the leveling hitch of FIG. 4.
Figure 6:
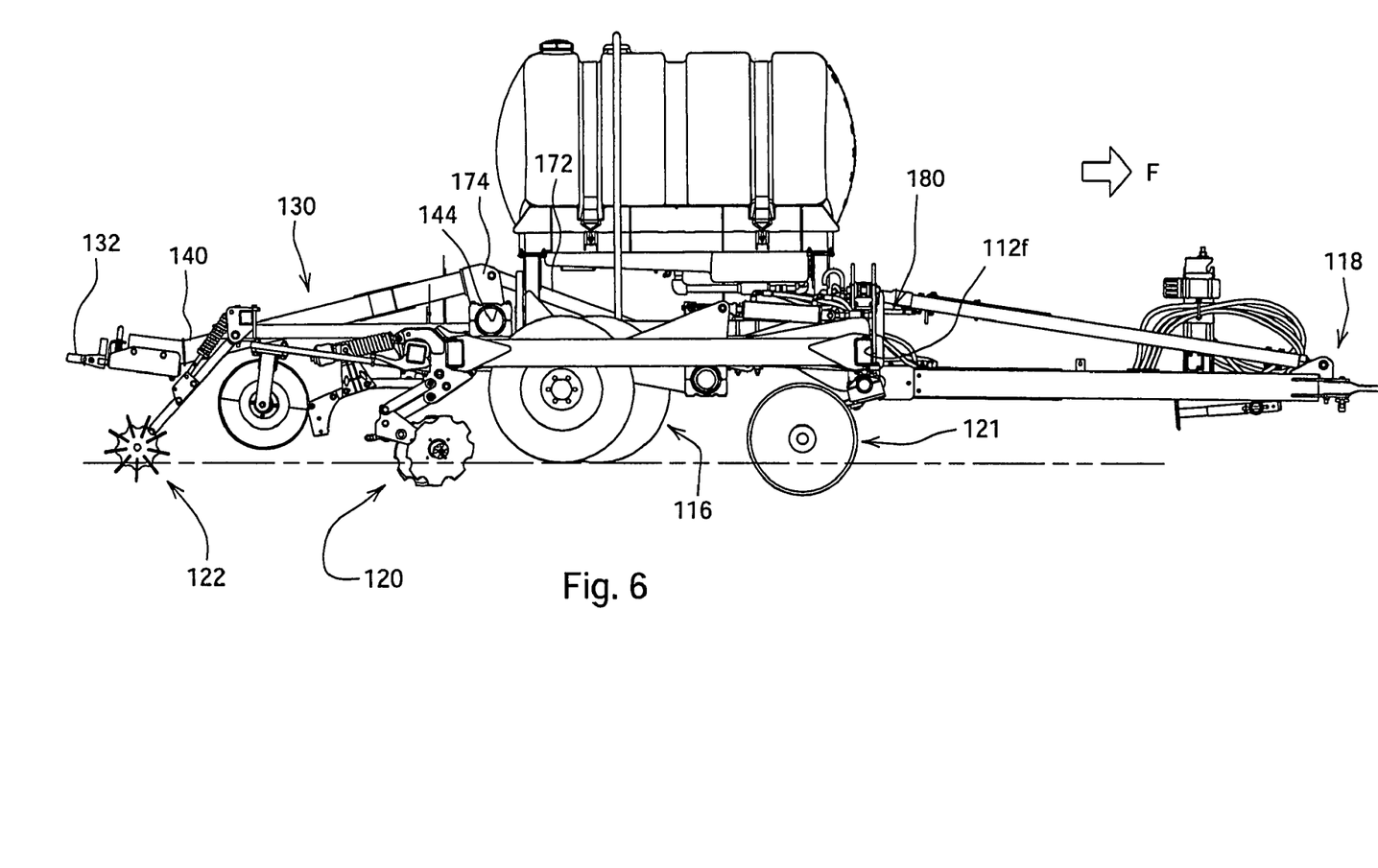
FIG. 6 is a view similar to FIG. 4 but showing the implement in the lowered field-working position.

Referring now to FIGS. 4-6, an alternate embodiment of the invention is shown. A tillage implement 110 including a main frame 112 supported by lift wheel assemblies 116 for forward movement (F) over the ground. A forward hitch assembly 118 adapted for connection to a towing vehicle (not shown) is attached to the frame 112. The frame 112 supports conventional earth engaging tools and trailing tools indicated generally at 120, 121 and 122 substantially behind a rearmost portion 112r of the main frame 112.

Hydraulic cylinders 124 operably connected to the lift wheel assemblies 116 raise and lower the frame 112 for moving the implement 110 between a raised transport position (FIG. 4) and lowered field-working positions (FIG. 6). A rear hitch assembly 130 is movably mounted on the main frame 112 and includes a rear connector 132 for towing a trailing implement (not shown) behind the trailing tools 122.

The rear hitch assembly 130 includes a main hitch beam 140 having a rearwardly and downwardly directed end supporting the rear connector 132, and a forwardmost end 142 fixed to a separate hitch rockshaft 144 supported for rotation about a hitch rockshaft axis 144a located above the main frame 112. Rockshaft support journals 146 connected to the frame adjacent the rearmost portion 112r rotatably mount the rockshaft 144 on the frame 112.

An implement lift rockshaft 154 is rotatably mounted on the frame 112 by journals 156 for rotation about a transversely extending lift axis 154a located below the frame. The lift rockshaft 154 is located rearwardly of a forward frame member 112f and forwardly of the rearmost member 112r. The lift wheel assemblies 116 are connected for rotation with the rockshaft 154 between a transport position (FIG. 4) and a field-working position (FIG. 6). Transversely spaced lever arms 162 are fixed to a central portion of the rockshaft 154 and extend radially from the rockshaft axis 154a upwardly and rearwardly towards the hitch rockshaft 144. Links 172 include lower forward ends pivotally connected to the lever arms 162 and upper aft ends pivotally connected to hitch rockshaft arms 174 transversely spaced on the rockshaft 144. The forwardmost end 142 of the beam 140 is connected to a mounting plate 182 fixed to the arms 174 and to a central mounting plate 184.

As the cylinders 124 are extended to rotate the lift rockshaft in the counterclockwise direction, the wheel assemblies 116 lower to raise the frame 112 (FIG. 4). At the same time, the links 172 cause the hitch rockshaft 144 to also rotate in the counterclockwise direction to rotate the connector 132 downwardly about the axis 144a to maintain a generally constant rear hitch height above the ground. Retraction of the cylinders 124 rotates the lift rockshaft 154 in the clockwise direction to raise the wheel assemblies 116 and lower the frame 112. At the same time, the hitch rockshaft 144 is rotated in the clockwise direction to rotate the connector 132 upwardly about the axis 144a to maintain hitch connector height. A conventional forward hitch control 180 (FIG. 5) is connected between the forward hitch assembly 118 and the lift rockshaft 154 to help level the main frame 112 as the implement 110 is raised and lowered.

The rear hitch assembly 130 is located substantially behind the forwardmost frame member 112f and behind and above the lift rockshaft 154 (FIG. 6) for minimal interference with trash and soil flow under the frame 112 during field-working operations. The over-frame rear hitch construction facilitates good flow characteristics and mounting of the tools 120 at any desired location under the aft member 112r without rear hitch interference. The single beam hitch construction is easily accommodated between adjacent pairs of trailing implements 122, such as rolling basket assemblies, both in the transport (FIG. 4) and the field-working (FIG. 6) positions.

Having described the preferred embodiment, it will become apparent that various modifications can be made without departing from the scope of the invention as defined in the accompanying claims.

The invention claimed is:

1. Implement rear hitch leveling structure, comprising;
   an implement frame having a forward portion and an aft portion and adapted for forward movement over ground;
   an implement lift rockshaft coupled to the implement frame member for rotation about a transversely extending rockshaft axis to raise and lower the implement frame, the lift rockshaft located between the forward portion and the aft portion of the implement frame;
   a lever arm fixed to the implement lift rockshaft for rotation therewith;
   a fore-and-aft extending hitch assembly having a forwardmost end connected to the lever arm fixed to the implement lift rockshaft rearwardly of the forward portion of the frame, the hitch assembly including a hitch beam, and a rear connector supported from the hitch beam behind the implement frame and adapted for connection to a trailing implement behind the aft portion of the implement frame, the forwardmost end of the hitch assembly constrained for movement with the lift rockshaft as lift rockshaft is rotated; and
   an attitude control link connected between the implement frame and the hitch assembly rearwardly of the lift rockshaft for lowering and raising the hitch connector as the implement frame is raised and lowered, respectively, with rotation of the lift rockshaft.

2. The leveling structure as set forth in claim 1 wherein the forwardmost end of the hitch assembly is moved in a foreand-aft direction relative to the implement frame by rotation of the lever arm by the lift rockshaft.

3. The leveling structure as set forth in claim 2 wherein the attitude control link is pivotally connected between the implement frame and the hitch beam for pivoting the hitch beam about the connection of the forwardmost end of the hitch assembly to the lever arm as the lift rockshaft is rotated.

4. The leveling structure as set forth in claim 3 wherein the attitude control link is pivotally connected to the implement frame above the lift rockshaft and wherein towing forces are substantially transferred from the rear connector through the link to the implement frame.

5. The leveling structure as set forth in claim 2 wherein the hitch assembly includes a fore-and-aft extending rectangular frame with side members defining the hitch beam, wherein the forwardmost end comprises forward ends of the side members, and the lever arm comprises first and second arms radially projecting from the lift rockshaft and pivotally connected to the forward ends of the side members.

6. The leveling structure as set forth in claim 5 wherein the rectangular frame comprises a rear cross member supported above rearmost ends of the side members and supporting the rear connector between aft ends of the side members.

7. The leveling structure as set forth in claim 5 wherein the attitude control link comprises first and second links connected between the implement frame and a central portion of the rectangular frame.

8. The leveling structure as set forth in claim 7 wherein the first and second links have forwardmost link ends pivotally connected to the implement frame above the lift rockshaft and aft link ends extending downwardly and rearwardly from the forwardmost link ends to a pivotal connection with the hitch beam.

9. Implement rear hitch leveling structure, comprising;
an implement frame having a forward portion and an aft portion and adapted for forward movement over ground;
an implement lift rockshaft coupled to the implement frame member for rotation about a transversely extending rockshaft axis to raise and lower the implement frame, the lift rockshaft located between the forward portion and the aft portion of the implement frame;
a fore-and-aft extending hitch assembly having a forwardmost end connected to the implement lift rockshaft rearwardly of the forward portion of the frame, the hitch assembly including a hitch beam, a rear connector supported from the hitch beam and adapted for connection to a trailing implement behind the aft portion of the implement frame, and a link connected for movement with the lift rockshaft, the link moving the hitch connector vertically relative to the implement frame as the lift rockshaft is rotated;
wherein the hitch assembly includes a hitch rockshaft connected to the aft portion of the implement frame, linkage structure connecting the hitch rockshaft for rotation with the lift rockshaft, and wherein the hitch beam has a beam aft end connected for rotation with the hitch rockshaft; and
wherein the hitch rockshaft is supported above a rearmost transversely extending beam of the implement frame to minimize interference under the implement frame.

10. The leveling structure as set forth in claim 9 wherein the linkage structure includes a diagonal link extending from a pivotal connection with the lift rockshaft at a location below the implement frame upwardly and rearwardly to an opposite pivotal connection with the hitch rockshaft above the rearmost transversely extending beam of the implement frame.

11. The leveling structure as set forth in claim 9 including a first lever arm connected to the lift rockshaft, a second lever arm connected to the hitch rockshaft, and the linkage structure includes a rockshaft link connecting the first and second lever arms.

12. Implement rear hitch leveling structure for forward movement over ground, comprising;
an implement frame;
an implement lift rockshaft coupled to the implement frame for rotation about a transversely extending rockshaft axis for rotating between an implement raised position and an implement lowered position;
a hitch rockshaft connected to the implement frame for rotation about a second axis generally parallel to the rockshaft axis, the second axis located above the implement frame;
a hitch frame having a forward end pivotally connected to the implement frame member adjacent the lift rockshaft and an aft hitch frame portion adapted for connection to a trailing implement;
a fore-and-aft extending linkage having a forward end connected to and movable by the lift rockshaft and an aft end connected to the hitch rockshaft for rotating the hitch rockshaft about the second axis, the linkage rotating the hitch rockshaft to lower the aft frame portion as the lift rockshaft is rotated to the implement raised position and raising the aft frame portion as the lift rockshaft is rotated to the implement lowered position to maintain a generally constant aft frame portion height.

13. The leveling structure as set forth in claim 12 wherein the forward end of the hitch frame is fixed for rotation with the hitch rockshaft above the implement frame and rearwardly of the lift rockshaft.

14. The leveling structure as set forth in claim 12 wherein the implement frame includes a rearmost transversely extending frame member and hitch rockshaft is offset above the frame member.

15. Implement rear hitch leveling structure adapted for connection to a fore-and-aft extending implement main frame having a forward portion and an aft portion for forward movement over ground, comprising;
an implement lift rockshaft coupled to the main frame for rotation about a transversely extending rockshaft axis located between the forward portion and the aft portion, and a ground-engaging lift wheel assembly connected to the implement rockshaft and rotatable by the rockshaft to raise and lower the main frame with rotation of the lift rockshaft;
a fore-and-aft extending hitch assembly including a hitch frame having a forwardmost end pivotally connected to and movable with the rotation of the implement lift rockshaft rearwardly of the forward portion of the frame, a rear hitch connector supported from an aft end of the hitch frame rearwardly of the lift wheel assembly and adapted for connection to a trailing implement behind the aft portion of the main frame, and attitude control structure connected to a central portion of the hitch assembly between the rear connector and the forwardmost end of the hitch frame, the attitude control structure causing the hitch connector to move vertically relative to the implement frame as the lift rockshaft is rotated.

16. The leveling structure as set forth in claim 15 wherein the attitude control structure comprises a link pivotally connected between the main frame and the hitch frame.

17. The leveling structure as set forth in claim 15 including a lever arm connected to the lift rockshaft, and wherein the forward most end of the hitch frame is connected to the lever arm.

18. The leveling structure as set forth in claim 17 wherein the attitude control structure includes a pivotal connection between the hitch frame and the implement frame.

19. The leveling structure as set forth in claim 18 wherein the attitude control structure comprises a link having a forward end pivotally connected to the main frame above the lift rockshaft and to the central portion of the hitch assembly.

20. The leveling structure as set forth in claim 19 wherein the forwardmost end of the hitch assembly is supported from the lift rockshaft below the main frame, and wherein the forward end of the hitch frame moves upwardly relative to the lift rockshaft as the implement is lowered.

* * * * *